United States Patent
Haynes et al.

(10) Patent No.: US 12,163,378 B2
(45) Date of Patent: Dec. 10, 2024

(54) LADDER HAVING SENSOR AND COMPUTING DEVICE FOR SAME

(71) Applicant: Otto Ladder Safety, Inc., Oakton, VA (US)

(72) Inventors: Clinton A. Haynes, Mason, OH (US); Daniel L. Morrow, Batavia, OH (US); Shannon R. Read, Lebanon, OH (US); Joseph Krumme Bullard, West Chester, OH (US)

(73) Assignee: Otto Ladder Safety, Inc., Oakton, VA (US)

( * ) Notice: Subject to any disclaimer, the term of this patent is extended or adjusted under 35 U.S.C. 154(b) by 0 days.

(21) Appl. No.: 18/510,912

(22) Filed: Nov. 16, 2023

(65) Prior Publication Data

US 2024/0344394 A1   Oct. 17, 2024

Related U.S. Application Data

(63) Continuation of application No. 18/127,773, filed on Mar. 29, 2023, now Pat. No. 11,834,906, which is a continuation of application No. 17/952,476, filed on Sep. 26, 2022, now Pat. No. 11,643,876, which is a continuation of application No. 16/763,076, filed as application No. PCT/US2018/061283 on Nov. 15, 2018, now Pat. No. 11,499,370.

(60) Provisional application No. 62/665,008, filed on May 1, 2018, provisional application No. 62/586,278, filed on Nov. 15, 2017.

(51) Int. Cl.
| | | |
|---|---|---|
| E06C 7/00 | (2006.01) | |
| E06C 7/42 | (2006.01) | |
| G01D 5/14 | (2006.01) | |
| G01L 1/22 | (2006.01) | |
| G08B 21/02 | (2006.01) | |
| H04W 4/80 | (2018.01) | |
| E06C 1/18 | (2006.01) | |

(52) U.S. Cl.
CPC ............... *E06C 7/003* (2013.01); *E06C 7/42* (2013.01); *G01D 5/145* (2013.01); *G01L 1/22* (2013.01); *G08B 21/02* (2013.01); *H04W 4/80* (2018.02); *E06C 1/18* (2013.01)

(58) Field of Classification Search
None
See application file for complete search history.

(56) References Cited

U.S. PATENT DOCUMENTS 11,834,906 B2 * 12/2023 Haynes ................... E06C 7/003

* cited by examiner

*Primary Examiner* — K. Wong
(74) *Attorney, Agent, or Firm* — Saul Ewing LLP; Brian R. Landry

(57) ABSTRACT

A ladder including sensors is provided. A remote computing device is also provided that communicates with the sensors to facilitate detection of various operating conditions. Methods for detection are also provided. One aspect of the invention provides a method for detecting stability of a ladder, the ladder comprising a pair of side rails, a plurality of steps that extend between the side rails, a sensor coupled with the ladder and configured to detect loading on the ladder. The method includes: communicating wirelessly, by a remote computing device, with the sensor; detecting, by the remote computing device, a presence of a user on the ladder; during the presence of a user on the ladder, monitoring the sensor, by the remote computing device, for an instability condition; and when the instability condition occurs, generating an alert of the instability condition.

11 Claims, 10 Drawing Sheets

LADDER HAVING SENSOR AND COMPUTING DEVICE FOR SAME

REFERENCE TO RELATED APPLICATIONS

This application is a continuation of U.S. nonprovisional patent application Ser. No. 18/127,773, filed Mar. 29, 2023, which is a continuation of U.S. nonprovisional patent application Ser. No. 17/952,476 filed Sep. 26, 2022, now U.S. Pat. No. 11,643,876, issued May 9, 2023, which is a continuation of U.S. nonprovisional patent application Ser. No. 16/763,076, now U.S. Pat. No. 11,499,370, issued Nov. 15, 2022, which is a U.S. National Stage Entry of Patent Cooperation Treaty application Serial No. PCT/US2018/061283, filed Nov. 15, 2018, and which claims priority of U.S. provisional patent application Ser. No. 62/586,278, entitled Ladder Having Sensor and Computing Device for Same, filed Nov. 15, 2017, and U.S. provisional patent application Ser. No. 62/665,008, entitled Ladder Having Sensor and Computing Device for Same, filed May 1, 2018, and hereby incorporates each of these by reference herein in its respective entirety.

TECHNICAL FIELD

The apparatus and methods described below generally relate to a ladder having at least one sensor for detecting operating conditions of the ladder. Sensor data from the sensor(s) is transmitted to a computing device for processing.

BACKGROUND

When a user climbs a ladder, there are many different operating conditions that can affect the ability of the user to properly use or operate the ladder.

BRIEF DESCRIPTION OF THE DRAWINGS

Various embodiments will become better understood with regard to the following description, appended claims and accompanying drawings wherein:

DETAILED DESCRIPTION

Figure 1:
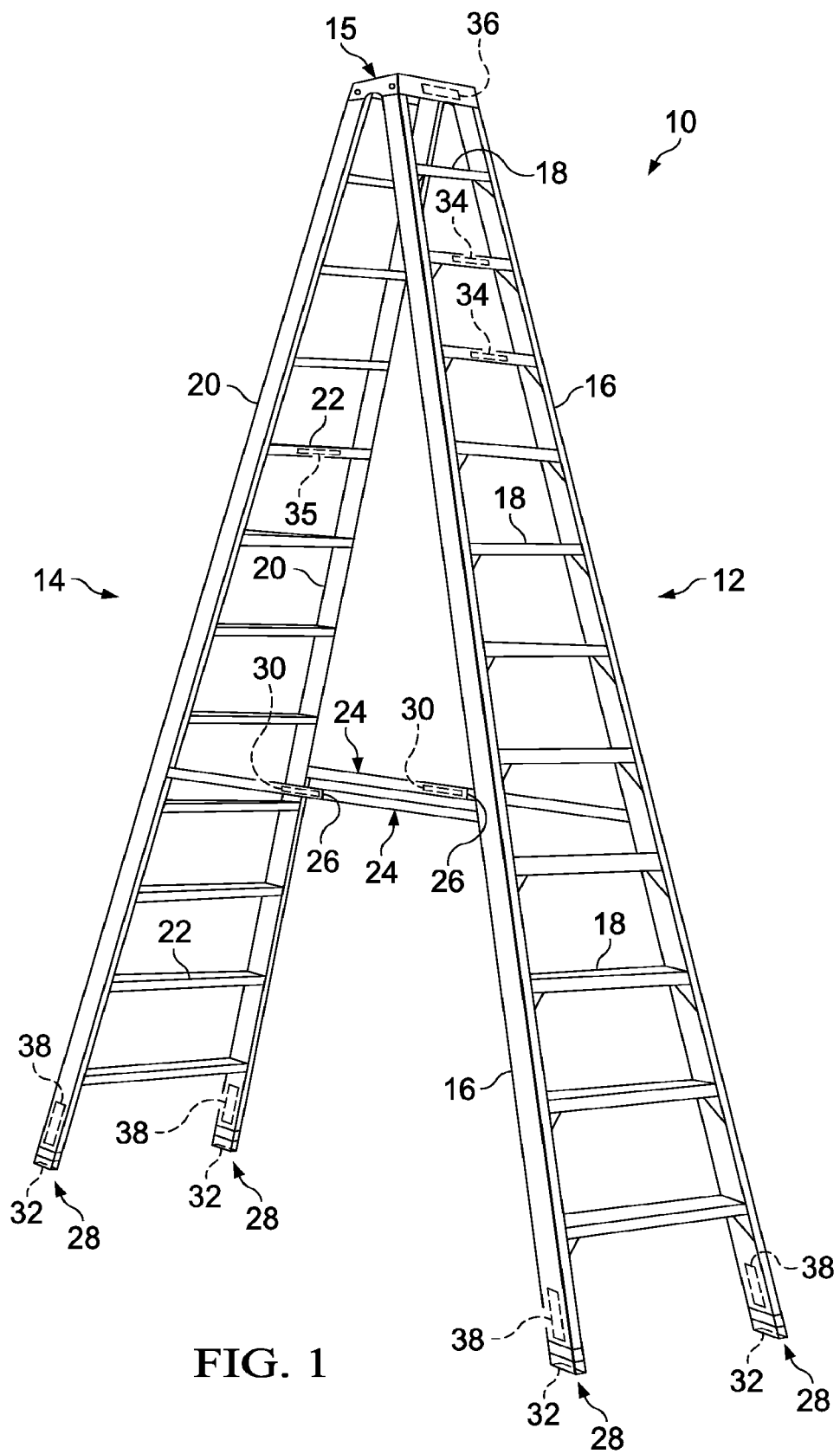
FIG. 1 is an isometric view depicting a ladder comprising a plurality of sensors, in accordance with one embodiment.

Embodiments are hereinafter described in detail in connection with the views and examples of FIGS. 1-11, wherein like numbers indicate the same or corresponding elements throughout the views. A ladder 10 in accordance with one embodiment is generally depicted in FIG. 1 and, as will be described in further detail below, can include a plurality of sensors (e.g., 30, 32, 34, 35, 36, 38) such that the ladder 10 can be considered to be a "smart ladder" or an "intelligent ladder." The ladder 10 can include a climbing section 12 and a brace section 14 that are pivotally coupled together by a top cap 15. The climbing section 12 can include a pair of front side rails 16 and a plurality of steps 18 that extend between the front side rails 16. The steps 18 can be configured to facilitate support of a user climbing the ladder 10. The brace section 14 can include a pair of rear side rails 20 and a plurality of braces 22 that extend between the rear side rails 20. The braces 22 can provide structural support to the ladder 10 but are not structurally rigid enough to support a user climbing the ladder 10 (e.g., vertical loading on the braces 22). It is to be appreciated that the brace section 14 can alternatively be replaced with a climbing section (e.g., 12) such that the ladder 10 is climbable on both sides. It is also to be appreciated that although the ladder 10 is illustrated as a folding ladder, other types of ladders are contemplated for the principles described below, such as extension ladders and multi-position ladders.

The ladder 10 can include a pair of spreader bars 24 that each extend between respective ones of the front and rear side rails 16, 20. Each spreader bar 24 can include a hinge member 26 that facilitates selective folding of the spreader bars 24 between a locked position (as illustrated in FIG. 1) and an unlocked position (not shown). Each of the front and rear side rails 16, 20 can include a foot portion 28 that is configured to contact a ground surface. In one embodiment, the foot portions 28 can each comprise a footpad.

The ladder 10 can include a plurality of spreader bar sensors 30 that are configured to facilitate detection of the locked position of the spreader bars 24 (i.e., whether the spreader bars 24 are in their respective locked positions). Each of the spreader bar sensors 30 can be mounted on one of the hinge members 26. It is to be appreciated, however, that the spreader bar sensors 30 can be provided at any suitable location on the ladder 10 to facilitate detection of the position of the spreader bars 24.

In one embodiment, the spreader bar sensors 30 can comprise a strain sensor (e.g., strain gage or a plastic strain sensor). In such an embodiment, the spreader bar sensors 30 can facilitate detection of the position of the spreader bars 24 as a function of the load on the spreader bars 24. In another embodiment, the spreader bar sensors 30 can comprise a hall effect sensor. In such an embodiment, the hall effect sensors can be proximity based sensors that cooperate with a magnet to facilitate detection of the spreader bars 24 being locked at the hinge members 26. In yet another embodiment, the spreader bar sensors 30 can comprise an angular position sensor (e.g., an inertial measurement unit (IMU) (e.g., an accelerometer, a gyroscope, and/or a magnetometer) or an inclinometer). In such an embodiment, respective ones of the angular position sensors can be provided on one of the spreader bars 24 such that the position of the spreader bars 24 can be detected as a function of the angle of the spreader bars 24. An IMU can additionally be provided on one of the steps 18 to serve as a reference for the other angle position sensors provided on the spreader bars 24. In still yet another embodiment, the spreader bar sensors 30 can comprise an impedance type sensor (e.g., a resistive or capacitive sensor) such that the position of the spreader bars 24 can be detected as a function of the compressive force of the hinge members 26. In still yet another embodiment, each of the spreader bar sensors 30 can comprise a contact switch associated with the hinge members 26 that is configured to selectively change state (i.e., close) when the spreader bars 24 are moved between their unlocked and locked positions. It is to be appreciated that the spreader bar sensors 30 can comprise any of a variety of other suitable sensors located at any of a variety of other suitable locations on the spreader bars 24 for facilitating detection of the position of the spreader bars 24. It is also to be appreciated that the spreader bar sensors 30 can be utilized to detect any of a variety of other conditions on the ladder 10 that might be detectable at the spreader bars 24, such as a hazardous condition, an instability condition, a presence of a user on the ladder or whether the ladder 10 has been deployed or is still folded.

The ladder 10 can also include a plurality of base sensors 32. Each of the base sensors 32 can be disposed on one of the foot portions 28 and configured to detect the degree to which the foot portions 28 are making contact with a ground surface when load is applied to the ladder 10 (e.g., when the user begins ascending the ladder 10). In one embodiment, each of the base sensors 32 can comprise a compressive load sensor (e.g., load cell) disposed underneath one of the foot portions 28. In such an embodiment, the contact of each of the foot portions 28 with the ground can be detected as a function of the loading detected by the compressive load cells. In another embodiment, each of the base sensors 32 can comprise one of a strain sensor, a hall effect sensor, or an impedance type sensor. In another embodiment, each of the base sensors 32 can comprise an angular position sensor that facilitates detection of the instability of the ladder 10 as a function of angular motion (e.g., wobble) of the ladder 10. In yet another embodiment, each of the base sensors 32 can comprise a contact switch provided beneath the foot portions 28 that selectively changes state (i.e., closes) as a function of the foot portions 28 properly contacting a ground surface. It is to be appreciated that the base sensors 32 can comprise any of a variety of other suitable sensors that facilitate detection of positioning of the foot portions 28 with respect to a ground surface. It is also to be appreciated that the base sensors 32 can be utilized to detect any of a variety of other conditions on the ladder 10 that might be detectable at the foot portions 28 of the ladder 10, such as a hazardous condition, a presence of a user on the ladder, or whether the ladder 10 has been deployed or is still folded.

Still referring to FIG. 1, the ladder 10 can include a step sensor 34 disposed on one of the steps 18 and configured to detect the presence of a user or a user's foot on the step 18. The step sensor 34 can be located on the step 18 that is located above the maximum recommended user standing height for the ladder 10 (e.g., the height H illustrated in FIG. 1) and/or the step 18 located immediately below the maximum recommended user standing height for the ladder 10 (e.g., the height H illustrated in FIG. 1). Although only two steps are shown to include step sensors 34, it is to be appreciated that any other steps 18 can include a step sensor 34 to facilitate detection of the presence of a user on that particular step 18.

In one embodiment, the step sensor 34 can comprise one of a strain sensor, a hall effect sensor, or an impedance type sensor. In such an embodiment, respective ones of the strain sensor, the hall effect sensor, or the impedance type sensor can be provided on the steps 18 that are located above the height H such that the presence of a user's foot on one of the steps 18 above the height H can be detected as a function of the load on the steps 18. In another embodiment, the step sensor 34 can comprise a contact switch that selectively changes state (i.e., closes) when the user's foot contacts one of the steps 18 located above the height H. In other embodiments, the step sensor 34 can comprise any of a variety of other suitable sensors that facilitate detection of the presence of a user's foot on the steps 18 located above the height H. It is also to be appreciated that the step sensor 34 can be utilized to detect any of a variety of other conditions on the ladder 10 that might be detectable at the step 18, such as a hazardous condition, an instability condition, or whether the ladder 10 has been deployed or is still folded.

Still referring to FIG. 1, the ladder 10 can include a brace sensor 35 disposed on one of the braces 22 and configured to detect the presence of a user or a user's foot on the brace 22. In one embodiment, the brace sensor 35 can comprise one of a strain sensor, a hall effect sensor, or an impedance type sensor. In such an embodiment, respective ones of the strain sensor, the hall effect sensor, or the impedance type sensor can be provided on the brace sensor(s) 35 near the bottom of the ladder 10 such that the presence of a user or user's foot on the brace(s) 22 can be detected as a function of the load on the steps 18. In another embodiment, the brace sensor 35 can comprise a contact switch that selectively changes state (i.e., closes) when the user's foot contacts one of the braces 22. In other embodiments, the brace sensor 35 can comprise any of a variety of other suitable sensors that facilitate detection of the presence of a user's foot on the brace(s) 22. It is also to be appreciated that the brace sensor 35 can be utilized to detect any of a variety of other conditions on the ladder 10 that might be detectable at the braces 22, such as a hazardous condition, an instability condition, or whether the ladder 10 has been deployed or is still folded.

The ladder 10 can additionally include a top cap sensor 36 disposed on the top cap 15 and configured to detect tipping of the ladder 10. In one embodiment, the top cap sensor 36 can comprise an angular position sensor. In another embodiment, the top cap sensor 36 can comprise one of a strain sensor, a hall effect sensor, or an impedance type sensor that facilitates detection of a user falling from the ladder 10. In such an embodiment, respective ones of the strain sensor, the hall effect sensor, or the impedance type sensor can be provided at any location on the ladder 10 and can detect a sudden change in loading on the ladder 10 that is consistent with the user suddenly falling from the ladder 10. In other embodiments, the top cap sensor 36 can comprise any of a variety of other suitable sensors that facilitate detection of the tipping of the ladder 10 and/or detection of the user falling from the ladder 10. Although the top cap sensor 36 is shown to be disposed on the top cap 15, the top cap sensor 36 can additionally or alternatively be provided at any location along the ladder 10 that facilitates detection of tipping of the ladder 10 or a user falling from the ladder 10. It is to be appreciated that the top cap sensor 36 can comprise any of a variety of other suitable sensors at any of a variety of locations that facilitate detection of tipping of the ladder. It is also to be appreciated that the base sensors 32 can be utilized to detect any of a variety of other conditions on the ladder 10 that might be detectable at the top cap 15 of the ladder 10, such as a hazardous condition, an instability condition, or a presence of a user on the ladder (e.g., on the top cap 15).

The ladder 10 can also include a plurality of side rail sensors 38. Each of the side rail sensors 38 can be disposed on one of the front side rails 16 or the rear side rails 20 and configured to detect forces that are imparted to the front side rails 16 and the rear side rails 20. Although the side rail sensors 38 are shown to be disposed proximate to the foot portions 28, the side rail sensors 38 can additionally or alternatively be mounted at any location along the side rails 16, 20 that facilitates detection of forces imparted thereto.

In one embodiment, the side rail sensors 38 can comprise one of a strain sensor, a hall effect sensor, an impedance type sensor, or a capacitive type sensor such that the side rail sensors 38 facilitate detection of strain/load on the front side rail(s) 16 and/or the rear side rail(s) 20. The strain/load detected on the front side rail(s) 16 and/or the rear side rail(s) 20 can be used to monitor any of a variety of conditions on the ladder 10. For example, the load path of the front side rail(s) 16 and/or the rear side rail(s) 20 can be measured over time and the historical load patterns can be monitored to determine whether a problem might exist in any of the front side rail(s) 16 and the rear side rail(s) 20. In another example, the position of the spreader bars 24 can be detected as a function of the comparative strain/load between the front side rails 16 and the rear side rails 20. In yet another example, the position of the foot portions 28 relative to the ground can be detected as a function of the strain/load on the front side rail(s) 16 and/or the rear side rail(s) 20 when the user ascends the ladder 10. In yet another example, the presence of a user's foot on one of the steps 18 (e.g., above the height H) can be detected as a function of the distribution of weight and/or the center of gravity on the front side rail(s) 16 and/or the rear side rail(s) 20. In another embodiment, the side rail sensors 38 can comprise one of an inertial measurement unit or an inclinometer. In such an embodiment, the side rail sensors 38 can facilitate detection of the instability of the ladder 10 as a function of angular motion (e.g., wobble) of the ladder 10. It is to be appreciated that the side rail sensors 38 can comprise any of a variety of other suitable sensors located at any of a variety of other suitable locations on the side rail sensors 38. It is also to be appreciated that the spreader bar sensors 30 can be utilized to detect any of a variety of other conditions on the ladder 10 that might be detectable at the side rails 16, 20, such as a hazardous condition, an instability condition, a presence of a user on the ladder or whether the ladder 10 has been deployed or is still folded.

It is to be appreciated that any of a variety of suitable additional or alternative sensors are contemplated for the ladder 10, such as, for example, pressure transducers, or displacement transducers. In one embodiment, a global positioning system (GPS) unit (not shown) can be provided on the ladder 10. In such an embodiment, the location of the ladder 10 can be detected from the GPS unit substantially in real time which can aid in asset management and/or to enable locating the ladder 10 when its location is unknown (e.g., when it is stolen). It is also to be appreciated that sensors can be provided at any of a variety of locations on the ladder 10 to facilitate monitoring of a desired parameter.

Figure 2:
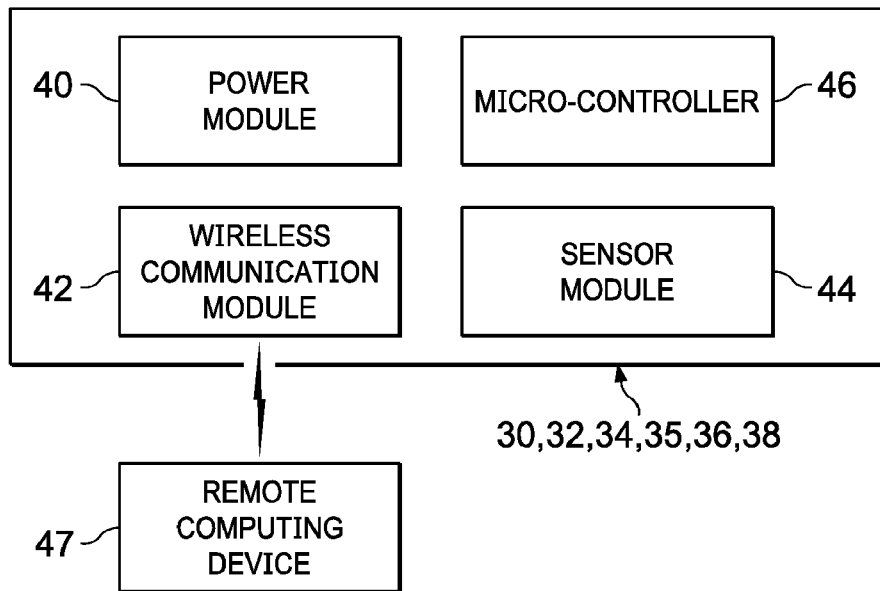
FIG. 2 is a schematic view depicting at least one of the sensors of the ladder of FIG. 1.

Referring now to FIG. 2, each of the sensors (e.g., the spreader bar sensors 30, the base sensors 32, the step sensors 34, the brace sensor 35, the top cap sensor 36, and the side rail sensors 38) can comprise a power module 40, a wireless communication module 42, a sensor module 44, and a microcontroller 46 (e.g., control module). The power module 40 can facilitate onboard powering of the sensor (e.g., 30, 32, 34, 35, 36, 38) and can comprise an integrated power storage device such as a disposable battery, a rechargeable battery, a supercapacitor or any of a variety of suitable alternative power storage arrangements. A rechargeable battery pack can be recharged through any of a variety of power sources, such as a wall plug, a solar panel, or energy harvested from a nearby communication device (e.g., a passively powered device). In one embodiment, some or all of the sensors can be collectively powered by an individual power source which can be remote from at least some of the sensors.

The wireless communication module 42 can facilitate wireless communication with a remote computing device 47 via any of a variety of wireless communication protocols such as, for example, near field communication (e.g., Bluetooth, Zigbee), a Wireless Personal Area Network (WPAN) (e.g., IrDA, UWB). The sensor module 44 can include the particular sensing device that is incorporated on the sensor (e.g., a strain sensor, a hall effect sensor, an impedance type sensor, a capacitive type sensor, an IMU, and/or an inclinometer). The microcontroller 46 can gather sensor data from the sensor module 44 for processing and can wirelessly communicate the sensor data (via the wireless communication module) to the remote computing device 47.

The remote computing device 47 can be a smartphone (e.g., an iOS or Android device), a laptop computer, a tablet, or a desktop computer, for example. The remote computing device 47 can have an application loaded thereon that is configured to analyze the data from the sensors 30, 32, 34, 35, 36, 38 and generate a warning, when appropriate, such that the sensors 30, 32, 34, 35, 36, 38 and the remote computing device 47 cooperate to provide a monitoring system (e.g., an internet of things (IoT) system) for the ladder 10. In some arrangements, the sensors 30, 32, 34, 35, 36, 38 can communicate directly (e.g., via a cellular connection) with a remote server (e.g., a cloud-based server) that is accessed by the remote computing device (e.g., the smartphone 60).

Each of the sensors 30, 32, 34, 35, 36, 38 can accordingly be stand-alone, self-contained units that do not require cables for communication or powering as can be common with many conventional sensor arrangements on ladders. Any of the sensors 30, 32, 34, 35, 36, 38 can accordingly be easily retrofit onto a conventional ladder to convert the conventional ladder from a "dumb ladder" into a "smart ladder." In an alternative embodiment, however, one or more of the sensors 30, 32, 34, 35, 36, 38 can be in direct wired communication with the remote computing device 47, via a cable (not shown), and can communicate with the remote computing device 47 via any of a variety of wired communication protocols.

Figure 3:
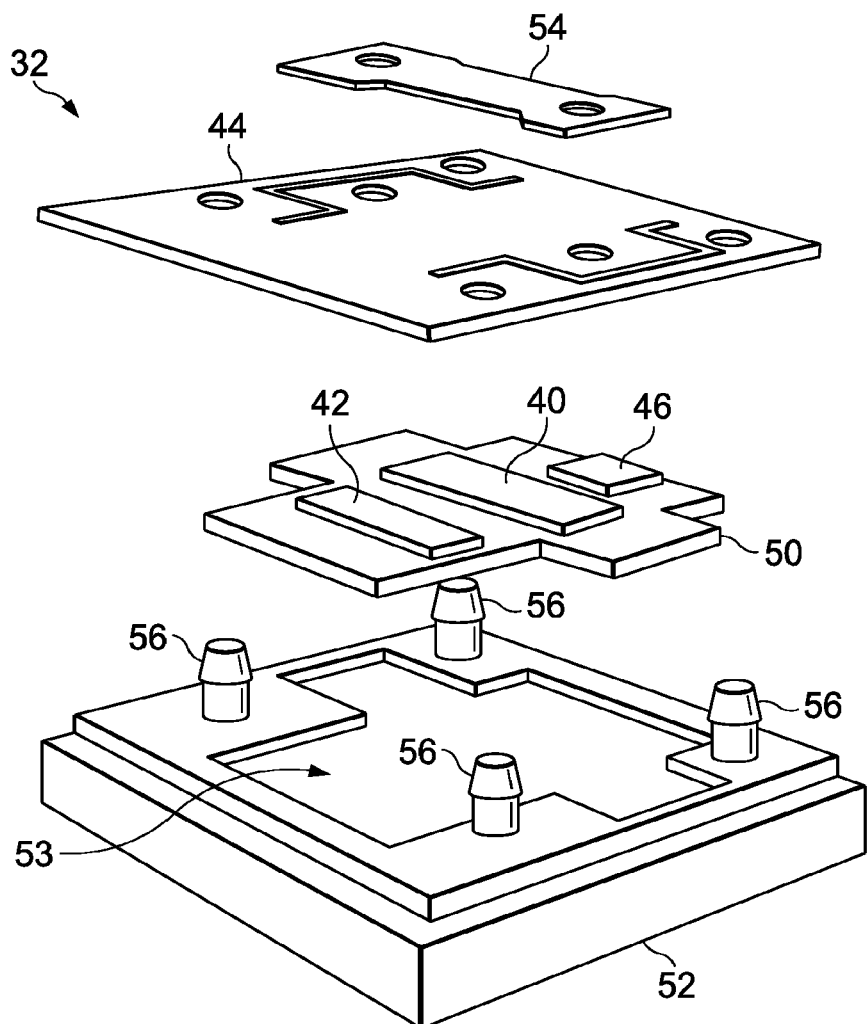
FIG. 3 is an exploded enlarged isometric view depicting a base sensor of the ladder of FIG. 1.

Referring now to FIG. 3, one example of the base sensor 32 described above is illustrated which is shown to be retrofit onto the ladder 10. As illustrated in FIG. 3, the base sensor 32 can include a printed circuit board 50 that includes the power module 40, the wireless communication module 42, and the microcontroller 46 described above. The sensor module 44 can comprise a load cell and can be communicatively coupled with the microcontroller 46 such that the microcontroller 46 can gather sensor data from the load cell. The printed circuit board 50 and the sensor module 44 can be coupled with a foot pad 52. The foot pad 52 can define a receptacle 53 and the printed circuit board 50 can be disposed in the receptacle 53. The sensor module 44 can overlie the printed circuit board 50 such that the printed circuit board 50 is sandwiched between the foot pad 52 and sensor module 44. A spacer 54 can overlie the sensor module 44. The foot pad 52 can comprise a plurality of pins 56 that facilitate coupling of the sensor module 44 to the foot pad 52. In one embodiment, the foot pad 52 can be formed of an elastomeric material (e.g., rubber), but in other embodiments, the foot pad 52 can be formed of any variety of suitable alternative materials.

Figure 4:
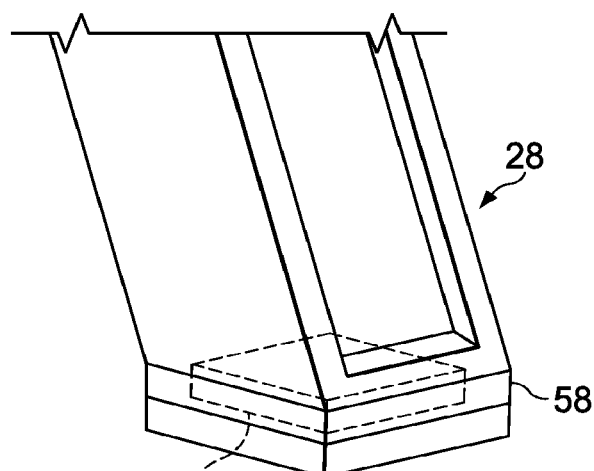
FIG. 4 is an assembled enlarged isometric view depicting the base sensor of the ladder of FIG. 1.

Referring now to FIG. 4, the base sensor 32 can be coupled with to a foot member 58 of the foot portion 28 of the ladder 10. The foot member 58 can exist on the ladder 10 prior to attachment of the base sensor 32 such that the base sensor 32 is effectively retrofit beneath the ladder 10 and the foot pad 52 serves as the new footing for the ladder 10. The pins 56 of the foot pad 52 can extend into the foot member 58 to facilitate securement of the base sensor 32 to the foot member 58. It is to be appreciated, however, that the foot pad 52 can have any of a variety of suitable additional or alternative attachment features, such as threaded fasteners, adhesives, or buckles, for example, that facilitate coupling of the foot pad 52 to the sensor module 44 and/or securement of the base sensor 32 to a bottom of a ladder.

During use of the ladder 10, the remote computing device 47 can be configured to detect the presence of a user on the ladder 10. In one embodiment, the user's presence on the ladder 10 can be detected from the base sensors 32 as a function of the additional weight that is provided to the ladder 10. In another embodiment, the user's presence on the ladder 10 can be detected from the side rail sensor(s) 38 as a function of the additional strain imparted on the front side rail 16 and/or rear side rail 20 due to the additional weight on the ladder 10. In yet another embodiment, the user's presence on the ladder 10 can be detected from a step sensor (e.g., 34) located on the step nearest to the bottom of the ladder 10 as a function of the presence of the user's foot on the step 18. It is to be appreciated that other sensors on the ladder 10 can be utilized to facilitate detection of the user's presence on the ladder 10.

Once the user's presence has been detected on the ladder 10, the remote computing device 47 can be configured to facilitate the detection of the presence of a hazardous condition on the ladder 10 from the sensor data. The remote computing device 47 can also be configured to generate an alert indicating the presence of the hazardous condition on the ladder 10. As will be described in more detail below, the sensors 30, 32, 34, 35, 36, 38 that are relied upon to facilitate detection of the hazardous condition and the type of alert that is ultimately generated during the presence of the hazardous condition, can depend upon the particular hazardous condition(s) being detected. Various examples of the hazardous conditions that can be detected by the remote computing device 47 will now be described.

In one embodiment, the remote computing device 47 can facilitate detection of an unlocked condition of the spreader bars 24 during use. In one embodiment, the unlocked condition of the spreader bars 24 can be detected from the spreader bar sensor 30 as a function of the position of the hinge member 26 (e.g., when the spreader bar sensor 30 comprises a contact switch or a hall effect sensor), the angle of the spreader bar 24 (e.g., when the spreader bar sensor 30 comprises an inclinometer), or the strain on the spreader bar 24 (e.g., when the spreader bar sensor 30 comprises a strain sensor). In another embodiment, the unlocked condition of the spreader bars 24 can be detected from the side rail sensor(s) 38 as a function of uncharacteristic strain imparted on the front side rail 16 and/or rear side rail 20 due to the spreader bars 24 being unlocked. It is to be appreciated that other sensors on the ladder 10 can be utilized to facilitate detection of the unlocked condition of the spreader bar 24.

When the presence of the user has been detected with at least one of the spreader bars 24 unlocked, the remote computing device 47 can generate an alert to the user notifying them that the spreader bars 24 are unlocked. The alert can be a visual alert, an audible alert, or a haptic alert (e.g., vibration) notifying the user of the hazardous condition. The remote computing device 47 can additionally or alternatively transmit a message (e.g., an email, a phone call, a text message, or a push notification) to a third party, such as to the user's supervisor, indicating that the ladder 10 is being used with the spreader bars 24 in an unlocked condition.

In another embodiment, the remote computing device 47 can facilitate detection of a damaged condition of any of the top cap 15, the side rails 16, 20, the steps 18, the braces 22, and/or the spreader bars 24. In one embodiment, the damaged condition of the top cap 15, the side rails 16, 20, the steps 18, the braces 22, and the spreader bars 24 can be detected from respective ones of the top cap sensor 36, the side rail sensors 38, the step sensor 34, the brace sensor 35, and the spreader bar sensor 30, as a function of the strain on the top cap 15, the side rails 16, 20, the steps 18, the braces 22, and the spreader bars 24, respectively (e.g., when the spreader bar sensor 30 comprises a strain sensor). It is to be appreciated that other sensors on the ladder 10 can be utilized to facilitate detection of the damaged condition of the top cap 15, the side rails 16, 20, the steps 18, the braces 22, and the spreader bars 24.

When the presence of the user has been detected with at least one of the top cap 15, the side rails 16, 20, the steps 18, the braces 22, and the spreader bars 24 being damaged, the remote computing device 47 can generate an alert to the user notifying them that the ladder 10 is damaged. The alert can be a visual alert, an audible alert, or a haptic alert (e.g., vibration) notifying the user of the hazardous condition. The remote computing device 47 can additionally or alternatively transmit a message (e.g., an email, a phone call, a text message, or a push notification) to a third party, such as to the user's supervisor, indicating that the ladder 10 is damaged and is being used.

In yet another embodiment, the remote computing device 47 can facilitate detection of unstable footing of the ladder 10 (e.g., an instability condition) during use. In one embodiment, the unstable footing of the ladder 10 can be detected from the base sensors 32 as a function of disproportionate loading on certain of the foot portions 28 (e.g., when the base sensor 32 comprises a strain sensor or load cell) or one of the foot portions 28 not contacting the ground (e.g., when the base sensor 32 comprises a contact switch or hall effect sensor). In another embodiment, the unstable footing of the ladder 10 can be detected from the side rail sensor(s) 38 as a function of uncharacteristic strain imparted on the front side rail 16 and/or rear side rail 20 due to the foot portions 28 not being in proper contact with the ground. In yet another embodiment, the unstable footing of the ladder 10 can be detected from the step sensor 34 and/or the brace sensor 35 as a function of uncharacteristic strain imparted on the steps 18 and/or braces 22 due to the foot portions 28 not being in proper contact with the ground. In still yet another embodiment, the unstable footing of the ladder 10 can be detected from the spreader bar sensors 30 as a function of uncharacteristic strain imparted on the spreader bars 24 due to the foot portions 28 not being in proper contact with the ground. It is to be appreciated that other sensors on the ladder 10 can be utilized to facilitate detection of the unlocked condition of the spreader bars 24.

When the presence of the user has been detected with the ladder 10 unstable, the remote computing device 47 can generate an alert to the user notifying them that the ladder is unstable. The alert can be a visual alert, an audible alert, or a haptic alert (e.g., vibration) notifying the user of the hazardous condition. The remote computing device 47 can additionally or alternatively transmit a message (e.g., an email, a phone call, a text message, or a push notification) to a third party, such as to the user's supervisor, indicating that the ladder 10 is unstable.

In yet another embodiment, the remote computing device 47 can facilitate detection of when the ladder 10 has overturned (e.g., an instability condition) during use. In one embodiment, the overturning of the ladder 10 can be detected from the base sensors 32 as a function of sudden loss of load at the foot portions 28 (e.g., when the base sensor 32 comprises a strain sensor or load cell) or the foot portions 28 no longer contacting the ground (e.g., when the base sensor 32 comprises a contact switch or hall effect sensor). In another embodiment, the overturning of the ladder 10 can be detected from the top cap sensor 36 as a function of the angle of the ladder 10 suddenly changing. In another embodiment, the overturning of the ladder 10 can be detected from the side rail sensor(s) 38 as a function of uncharacteristic strain imparted on the front side rail 16 and/or rear side rail 20 that is characteristic of the ladder 10 overturning. In yet another embodiment, the overturning of the ladder 10 can be detected from the step sensor 34 and/or the brace sensor 35 as a function of uncharacteristic strain imparted on the steps 18 and/or braces 22 that is characteristic of the ladder 10 overturning. In still yet another embodiment, the overturning of the ladder 10 can be detected from the spreader bar sensors 30 as a function of uncharacteristic strain imparted on the spreader bars 24 that is characteristic of the ladder 10 overturning. In still yet another embodiment, the remote computing device 47 can be a smartphone carried by the user and can detect the ladder 10 overturning directly (e.g., without using any of the sensors 30, 32, 34, 35, 36, 38) from an onboard IMU. It is to be appreciated that other sensors on the ladder 10 can be utilized to facilitate detection of overturning of the ladder.

When the presence of the user has been detected and subsequently the overturning of the ladder 10 is detected, the remote computing device 47 can generate an alert notifying the surrounding environment that the ladder 10 has overturned. The alert can be a visual alert and/or an audible alert that is significant enough to notify people in the vicinity of the ladder 10 that the ladder 10 has overturned and the user may need help. The remote computing device 47 can additionally or alternatively transmit an alert electronically to other remote computing devices (e.g., smartphones) in the vicinity of the ladder 10 that the ladder 10 has overturned and the user may need help. The remote computing device 47 can additionally or alternatively generate a distress message that can be transmitted to a third party to notify the third party that the user may be in distress. In one embodiment, the remote computing device 47 can initiate a distress call to an emergency services provider (e.g., a 911 call) and/or can generate a message (e.g., text message, email, push notification) to a third party, such as a supervisor or site manager, to notify the emergency service provider and/or the third party that the user of the ladder 10 may be in distress.

In still yet another embodiment, the remote computing device 47 can facilitate detection of the user falling from the ladder 10 without overturning the ladder 10 (e.g., an instability condition) during use. In one embodiment, the user falling from the ladder 10 can be detected from the base sensors 32 as a function of sudden loss of load at the foot portions 28 (e.g., when the base sensor 32 comprises a strain sensor or load cell) or the foot portions 28 briefly losing contact with the ground (e.g., when the base sensor 32 comprises a contact switch or hall effect sensor). In another embodiment, the user falling from the ladder 10 can be detected from the side rail sensor(s) 38 as a function of the sudden loss of strain on the front side rail 16 and/or rear side rail 20 that is characteristic of the user falling from the ladder 10. In yet another embodiment, the user falling from the ladder 10 can be detected from the step sensor 34 and/or the brace sensor 35 as a function of the sudden loss of strain on the steps 18 and/or braces 22 that is characteristic of the user falling from the ladder 10. In still yet another embodiment, the user falling from the ladder 10 can be detected from the spreader bar sensors 30 as a function of the sudden loss of strain on the spreader bars 24 that is characteristic of the user falling from the ladder 10. In still yet another embodiment, the remote computing device 47 can be a smartphone carried by the user and can detect the user falling from the ladder 10 directly (e.g., without using any of the sensors 30, 32, 34, 35, 36, 38) from an onboard IMU. It is to be appreciated that other sensors on the ladder 10 can be utilized to facilitate detection of the user falling from the ladder 10.

When the presence of the user has been detected and subsequently the user falling from the ladder 10 is detected, the remote computing device 47 can generate an alert notifying the surrounding environment that the user has fallen from the ladder 10. The alert can be a visual alert and/or an audible alert that is significant enough to notify people in the vicinity of the ladder 10 that the user has fallen from the ladder 10 and the user may need help. The remote computing device 47 can additionally or alternatively transmit an alert electronically to other remote computing devices (e.g., smartphones) in the vicinity of the ladder 10 that the user has fallen from the ladder 10 and may need help. The remote computing device 47 can additionally or alternatively generate a distress message that can be transmitted to a third party to notify the third party that the user may be in distress. In one embodiment, the remote computing device 47 can initiate a distress call to an emergency services provider (e.g., a 911 call) and/or can generate a message (e.g., text message, email, push notification) to a third party, such as a supervisor or site manager, to notify the emergency service provider and/or the third party that the user of the ladder 10 may be in distress.

In still yet another embodiment, the remote computing device 47 can facilitate detection of a user's presence on a prohibited step (e.g., a step that is above a safe climbing height such as the height H shown in FIG. 1) during use. In one embodiment, the user's presence on a prohibited step can be detected from a step sensor (e.g., 34) located on the prohibited step (e.g., 18) as a function of the presence of the user's foot on the step 18. In another embodiment, the user's presence on a prohibited step can be detected from the base sensors 32 as a function of a center of gravity calculated from the load detected on the foot portions 28. In another embodiment, the user's presence on a prohibited step can be detected from the side rail sensor(s) 38 as a function of a center of gravity calculated from the strain detected on the front side rail 16 and/or rear side rail 20. In yet another embodiment, the user's presence on a prohibited step can be detected from the step sensor 34 and/or the brace sensor 35 as a function of a center of gravity calculated from the strain detected on the steps 18 and/or braces 22. It is to be appreciated that other sensors on the ladder 10 can be utilized to facilitate detection of the unlocked condition of the spreader bar 24.

When the presence of the user has been detected on a prohibited step, the remote computing device 47 can generate an alert to the user notifying them that they have climbed too high. The alert can be a visual alert, an audible alert, or a haptic alert (e.g., vibration) notifying the user of the hazardous condition. The remote computing device 47 can additionally or alternatively transmit a message (e.g., an email, a phone call, a text message, or a push notification) to a third party, such as to the user's supervisor, indicating that the user has climbed too high on the ladder 10.

In still yet another embodiment, the remote computing device 47 can be configured to detect the presence of a user on the braces 22. In one embodiment, the user's presence on the braces 22 can be detected from a brace sensor (e.g., 35) located on the brace(s) 22 near the bottom of the ladder 10 as a function of the presence of the user's foot on the braces 22 (e.g., when the brace sensor 35 is a contact sensor or a hall effect sensor) or of the additional strain imparted to the braces 22 (e.g., when the brace sensor 35 is a strain sensor). In another embodiment, the user's presence on the braces 22 can be detected from the base sensors 32 as a function of the additional weight that is provided on the brace section 14 of the ladder 10. In another embodiment, the user's presence on the braces 22 can be detected from the side rail sensor(s) 38 as a function of the additional strain imparted on the front side rail 16 and/or rear side rail 20 due to the additional weight on the brace section 14 of the ladder 10. It is to be appreciated that other sensors on the ladder 10 can be utilized to facilitate detection of the user's presence on the braces 22 of the ladder 10.

When the presence of the user has been detected on one of the braces 22, the remote computing device 47 can generate an alert to the user notifying them that they have climbed on the wrong side of the ladder 10. The alert can be a visual alert, an audible alert, or a haptic alert (e.g., vibration) notifying the user of the hazardous condition. The remote computing device 47 can additionally or alternatively transmit a message (e.g., an email, a phone call, a text message, or a push notification) to a third party, such as to the user's supervisor, indicating that the user has climbed on the wrong side of the ladder 10.

It is to be appreciated that the remote computing device 47 can be configured to provide other types of functionality to a user. In one embodiment, the remote computing device 47 can gather and log load data from at least some of the sensors 30, 32, 34, 36 to facilitate monitoring of the overall integrity of the ladder 10 over time. For example, when the front side rails 16, the steps 18, the rear side rails 20, the braces 22, and/or the spreader bars 24 are provided with load sensing sensors (e.g., a strain sensor, a hall effect sensor, or an impedance type sensor), load data from the load sensing sensors can be gathered periodically, logged, and analyzed for variations that indicate potential damage or an increased risk of failure of the ladder 10. When damage or a potential failure is detected, the remote computing device 47 can present a GUI to the user detailing the nature of the damage or potential failure.

In another embodiment, the remote computing device 47 can gather usage information (e.g., statistical data) and log the usage information as historical data about the ladder 10 from the sensors (e.g., duration of use of the ladder 10, the number of times the ladder 10 has been deployed, the number of times the ladder 10 has been ascended, the overall weight borne by the ladder 10 during each use, the number of times the ladder 10 has been misused) to facilitate tracking of the overall use of the ladder 10. In some instances, the usage information can indicate a tendency for a user to use the ladder 10 improperly. In some embodiments, the user can query the remote computing device 47 (e.g., via a GUI) to generate reports of the historical data.

It is to be appreciated that alternative ladder arrangements are contemplated that only have one or some of the sensors 30, 32, 34, 35, 36, 38. The particular sensors that might employed on a ladder arrangement can be determined by the hazardous conditions(s) that are desired to be detected.

Figure 5:
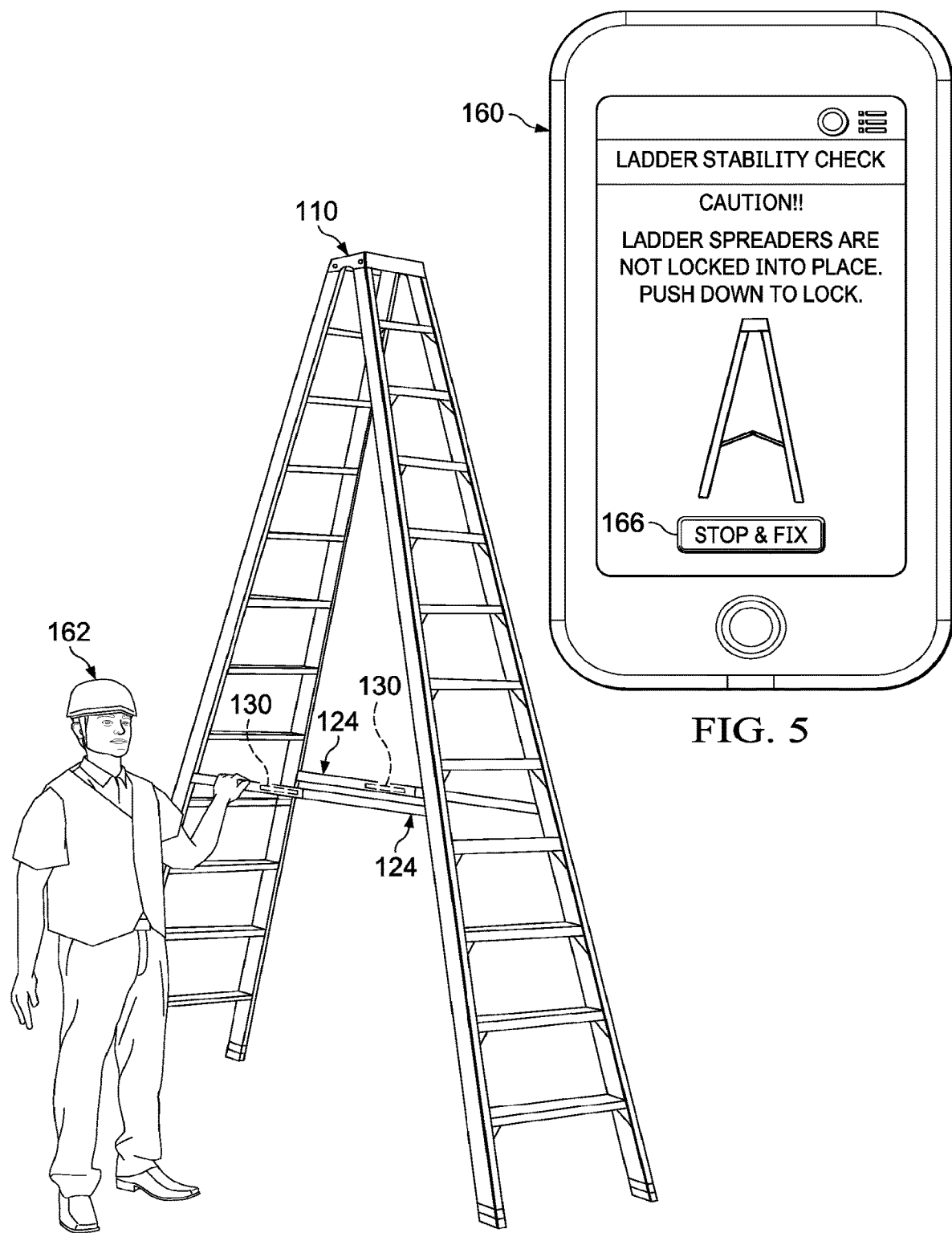
FIG. 5 is an isometric view depicting a ladder in association with a smartphone, in accordance with one embodiment.

FIGS. 5-9, which will now be discussed, represent various alternative embodiments detailing specification ladder and remote computing device arrangements. Referring now to FIG. 5 illustrates and alternative embodiment of a ladder 110 that is similar to the ladder 10 illustrated in FIG. 1. For example, the ladder 110 includes a pair of spreader bar sensor 130 that are each located on respective spreader bars 124 of the ladder 110. The spreader bar sensors 130 can wirelessly communicate with a smartphone 160 which can monitor the locked or unlocked condition of the spreader bars 124 (via the spreader bar sensors 130) and issue a warning to a user 162 to discourage the user 162 from ascending the ladder 110 when the spreader bars 124 are not in their locked positions. In particular, the spreader bar sensors 130 can periodically transmit spreader sensor data to the smartphone 160 which can include the locked or unlocked condition of the spreader bars 24 (such as when the spreader bar sensor 130 is a contact switch or a hall effect sensor) and/or physical parameters that might indicate (i.e., indirectly) the locked or unlocked condition of the spreader bars 24 (such as when the spreader bar sensor 130 is a strain gage or an impedance type sensor). The application loaded on the smartphone 160 can be configured to analyze the spreader sensor data and facilitate the issuance of the warning to the user when the spreader bars 124 are not in their locked positions.

In one embodiment, the application can generate a graphical user interface (GUI) 164 on the smartphone 160 that displays the status of the spreader bars 124. When the spreader bars 124 are not locked and when the ladder 110 is in use (e.g., the user ascends the ladder), the application can generate a visual alert, such as text accompanied by a flashing colored background. The application can additionally, or alternatively, facilitate generation of an audible sound and/or vibration from the smartphone 160. The GUI 164 can display a virtual button 166 that the user can press to acknowledge the warning and temporarily disable the alarm long enough to allow the user 162 to lock the spreader bars 124. In one embodiment, the application can facilitate generation of a warning message (e.g., text message, email, push notification) to a third party, such as a supervisor or site manager, to notify the third party when the user 162 has ascended the ladder 110 with the spreader bars 124 unlocked. In such an embodiment, the warning message can include various information relative to the use of the ladder 110, such as, for example, identification of the user 162 using the ladder 10, the geographic location of the ladder 110, or the duration of time the user was on the ladder 110 with the spreader bars 124 unlocked.

Figure 6:
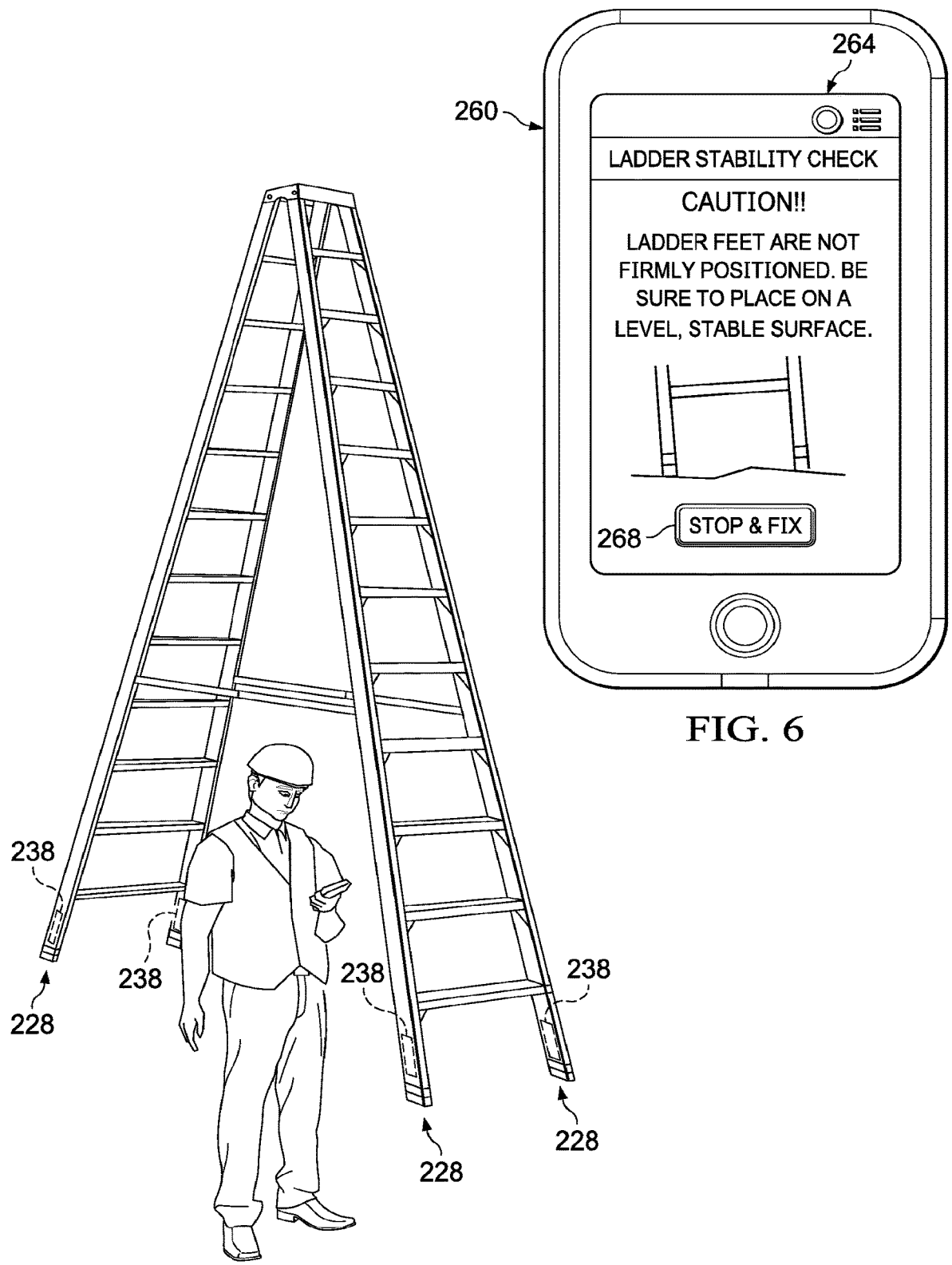
FIG. 6 is an isometric view depicting a ladder in association with a smartphone, in accordance with another embodiment.

FIG. 6 illustrates and alternative embodiment of a ladder 210 that is similar to the ladder 10 illustrated in FIG. 1. For example, the ladder 210 includes a plurality of base sensors 238 that are each coupled with respective foot portions 228 of the ladder 210. The base sensors 232 can wirelessly communicate with a smartphone 160 which can monitor the instability condition of the ladder 210 (via the base sensors 232) and issue a warning to a user 262 to discourage the user 262 from ascending the ladder 210 when any of the foot portions 28 are not contacting the ground surface when the user ascends the ladder 210. In particular, when the user ascends the ladder 210 and applies a downward load to the ladder 210, the base sensors 232 can periodically transmit base sensor data to the smartphone 260 which can include whether the foot portions 228 are contacting the ground (such as when the base sensor 232 is a contact switch or a hall effect sensor) and/or physical parameters that might indicate (i.e., indirectly) instability in ladder 210 (such as when the base sensor 232 is a strain gage or an impedance type sensor). The application loaded on the smartphone 260 can be configured to analyze the base sensor data and facilitate the issuance of the warning to the user 262 when any of the foot portions 228 are not contacting the ground surface and/or are experiencing uneven loading indicative of instability.

In one embodiment, the application can generate a GUI 264 on the smartphone 260 that displays the status of the foot portions 228. When any of the foot portions 228 are out of contact with the ground surface and/or are experiencing uneven loading when the ladder 10 is in use, the application can generate a visual warning, such as text accompanied by a flashing colored background. The application can additionally, or alternatively, facilitate generation of an audible sound and/or vibration from the smartphone 260. The GUI 264 can display a virtual button 268 that the user 262 can press to acknowledge the warning and temporarily disable the alarm long enough allow the user 262 to reposition the ladder 210 such that each of the foot portions 228 properly contacts the ground surface and/or are more evenly loaded.

Figure 7:
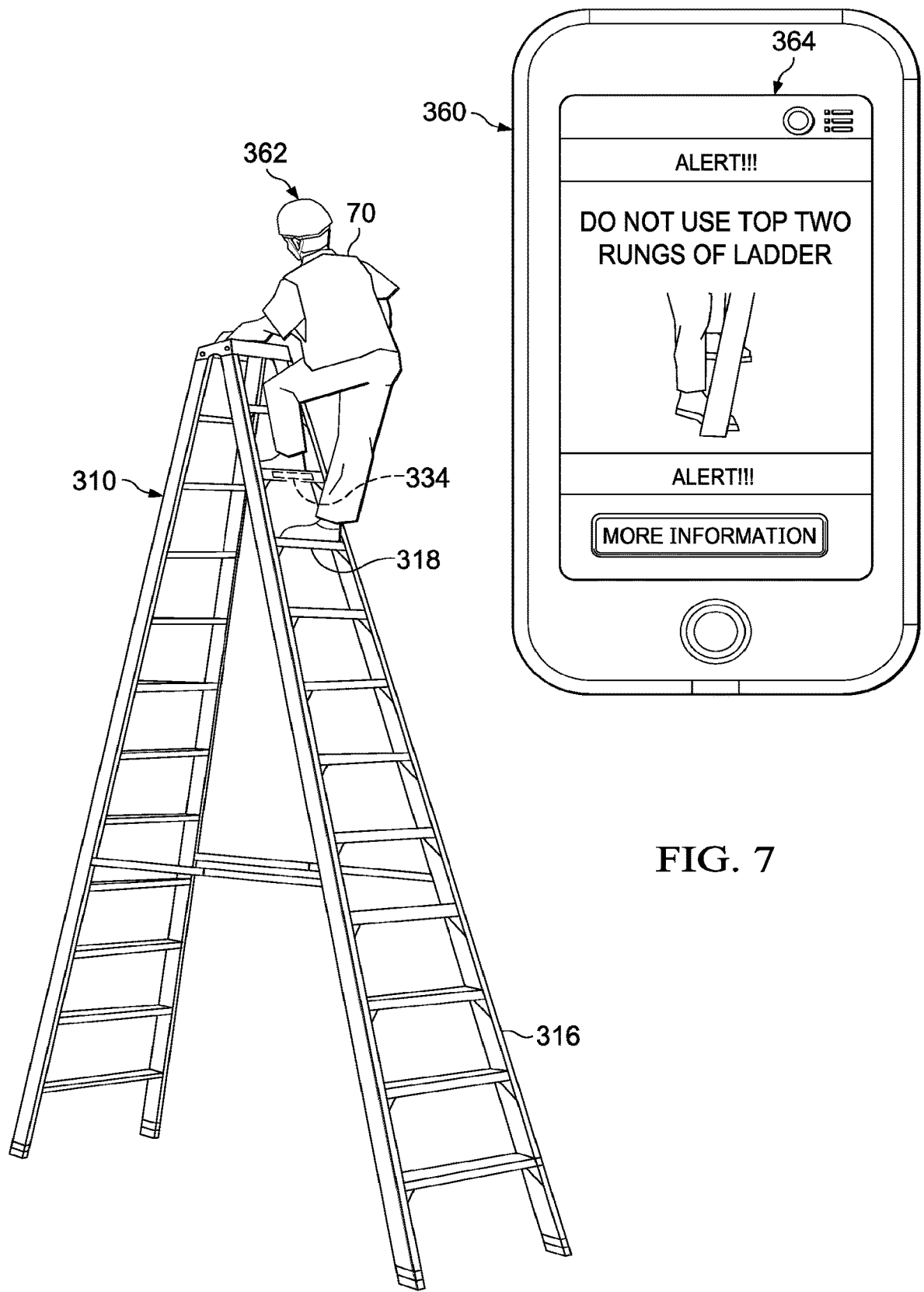
FIG. 7 is an isometric view depicting a ladder in association with a smartphone, in accordance with yet another embodiment.

FIG. 7 illustrates an alternative embodiment of a ladder 310 that is similar to the ladder 10 illustrated in FIG. 1. For example, the ladder 310 includes a step sensor 334 located on a step 318 that is disposed above the maximum recommended user standing height. The step sensor 334 can wirelessly communicate with a smartphone 360 which can monitor the status of the step 318 and issue a warning to discourage a 362 from ascending further. In particular, the step sensor 334 can periodically transmit step sensor data to the smartphone 360 which can include the status of the step 318 (e.g., whether a user's foot has contacted the step 318). The application loaded on the smartphone 360 can be configured to analyze the step sensor data and facilitate the issuance of the warning when the user's foot is detected on the step 318.

In one embodiment, the application can generate a GUI 364 on the smartphone 360 that displays the status of the step 318. When the user's foot contacts the step 318, the application can generate a visual warning, such as text accompanied by a flashing colored background. The application can additionally, or alternatively, facilitate generation of an audible sound and/or vibration from the smartphone 360. In one embodiment, the application can facilitate generation of a warning message (e.g., text message, email, push notification) to a third party, such as a supervisor or site manager, to notify the third party that the ladder 310 is being used improperly. In such an embodiment, the warning message can include various information relative to the use of the ladder, such as, for example, identification of the person using the ladder 310, geographic location of the ladder, or the duration of time that the user's foot was engaged with the step 318.

Still referring to FIG. 7, in one embodiment, the user 362 can wear a vest 370, in addition to or in lieu of the smartphone 360, that is communicatively coupled with the step sensor 334 (e.g., directly or through the smartphone 360) and is configured to generate a warning to the user 362 when the user's foot contacts the step 318. In one embodiment, the vest 370 can be configured to vibrate. In other embodiments, the vest 370 can additionally or alternatively, generate visual and/or audible warnings that notifies the user 362 as well as the surrounding environment that the ladder 310 is not being used properly.

It is to be appreciated that, although a vest is described, any of a variety of other types of apparel can be provided for issuing a warning to a user, such as a work belt or safety helmet, for example. In some embodiments, the ladder 310 may additionally or alternatively be equipped with onboard notification devices that are configured to issue a warning to the user (e.g., a vibration, a visual warning, or an audible warning) directly from the ladder 10. It is also to be appreciated that the vest 370 can additionally or alternatively be used in conjunction with spreader bar sensors (e.g., 30) and/or base sensors (e.g., 32) to issue a warning to a user.

Figure 8:
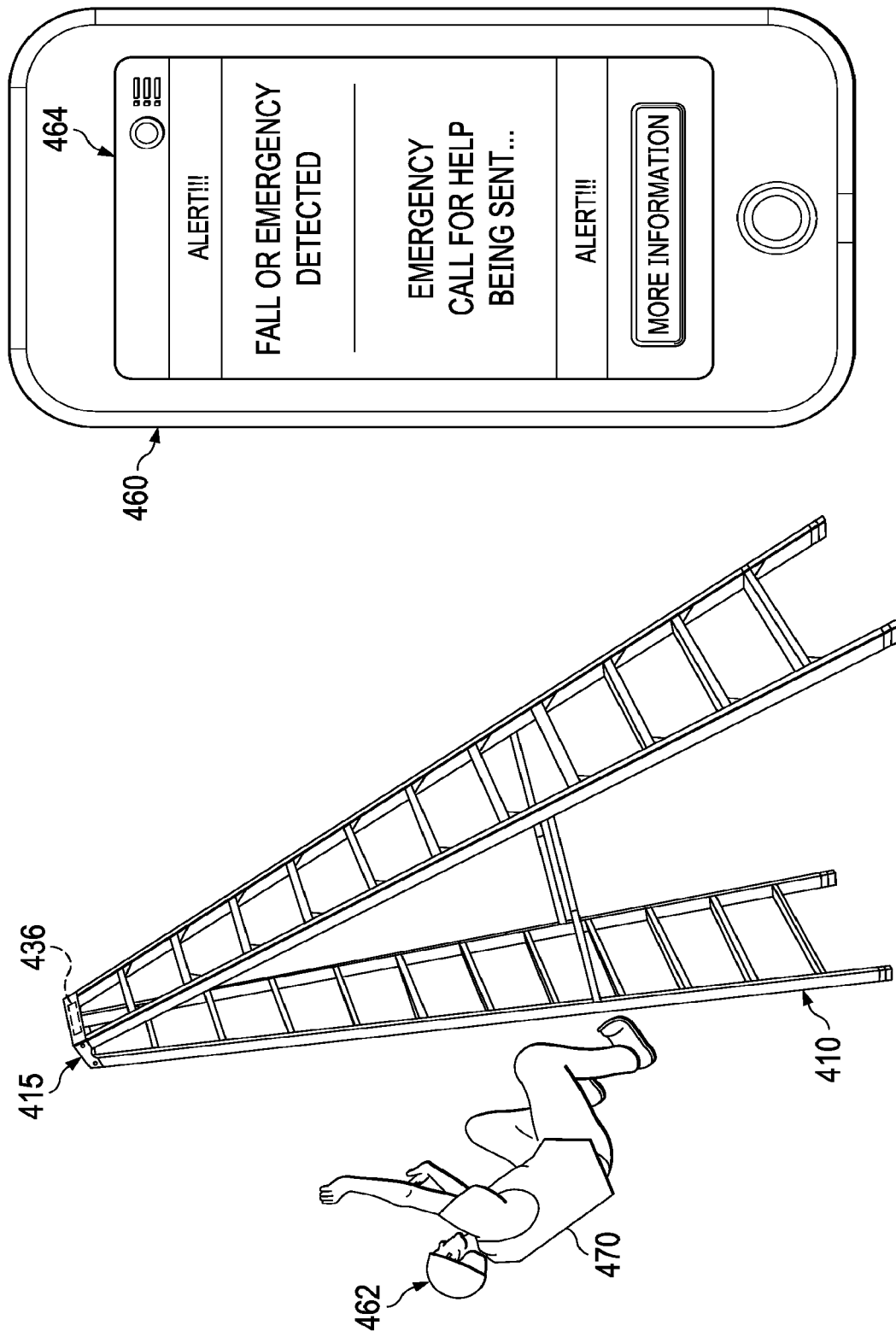
FIG. 8 is an isometric view depicting a ladder in association with a smartphone, in accordance with still yet another embodiment.

FIG. 8 illustrates an alternative embodiment of a ladder 410 that is similar to the ladder 10 illustrated in FIG. 1. For example, the ladder 410 includes a top cap sensor 436 coupled with a top cap 415 of the ladder 410. The top cap sensor 436 can wirelessly communicate with a smartphone 160 which can monitor the instability of the ladder 410. In particular, the top cap sensor 36 can periodically transmit stability sensor data to the smartphone 460 which can include the three dimensional coordinates of the top cap 415. The application loaded on the smartphone 360 can be configured to analyze the stability sensor data to determine whether the ladder 310 has tipped over and can facilitate issuance of an emergency message when it is determined that the ladder 310 has tipped over.

In one embodiment, when the ladder 410 wobbles excessively or tips over, the application can generate a GUI 464 on the smartphone 460 that displays a visual warning, such as text accompanied by a flashing colored background. The application can additionally, or alternatively, facilitate generation of an audible sound and/or vibration from the smartphone 60. The application can additionally generate a distress message that can be transmitted to a third party to notify the third party that the user 462 may be in distress. In one embodiment, the application can initiate a distress call to an emergency services provider (e.g., a 911 call) and/or can generate a message (e.g., text message, email, push notification) to a third party, such as a supervisor or site manager, to notify the emergency service provider and/or the third party that the user 462 of the ladder 410 may be in distress. In such an embodiment, the distress call and/or message can include various information relative to the use of the ladder, such as, for example, identification of the person using the ladder 410, preexisting medical conditions of the user, and/or geographic location of the ladder 410. A vest 470 can be communicatively coupled with the top cap sensor 436 (e.g., directly or through the smartphone 460) and can be worn by third parties on a job site to notify third parties that the user 462 may be in distress.

It is to be appreciated that the smartphone 460 can obtain sensor data from one or more other sensors to monitor of the overall stability of the user 462 on the ladder 410. The application loaded on the smartphone 460 can be configured to analyze the sensor data to determine whether the user has fallen from the ladder 410 (e.g., without the ladder 410 being tipped over) and can facilitate issuance of an emergency message when it is determined that the user has fallen from the ladder 410.

In one embodiment, the ladder 410 can be provided with a sensor (not shown) that is configured to identify the user that is currently using the ladder 410. The sensor can communicate with the user's smartphone (e.g., 438) and/or the vest 470 (via Bluetooth or Radio Frequency Identification) to facilitate identification of the user.

Figure 9:
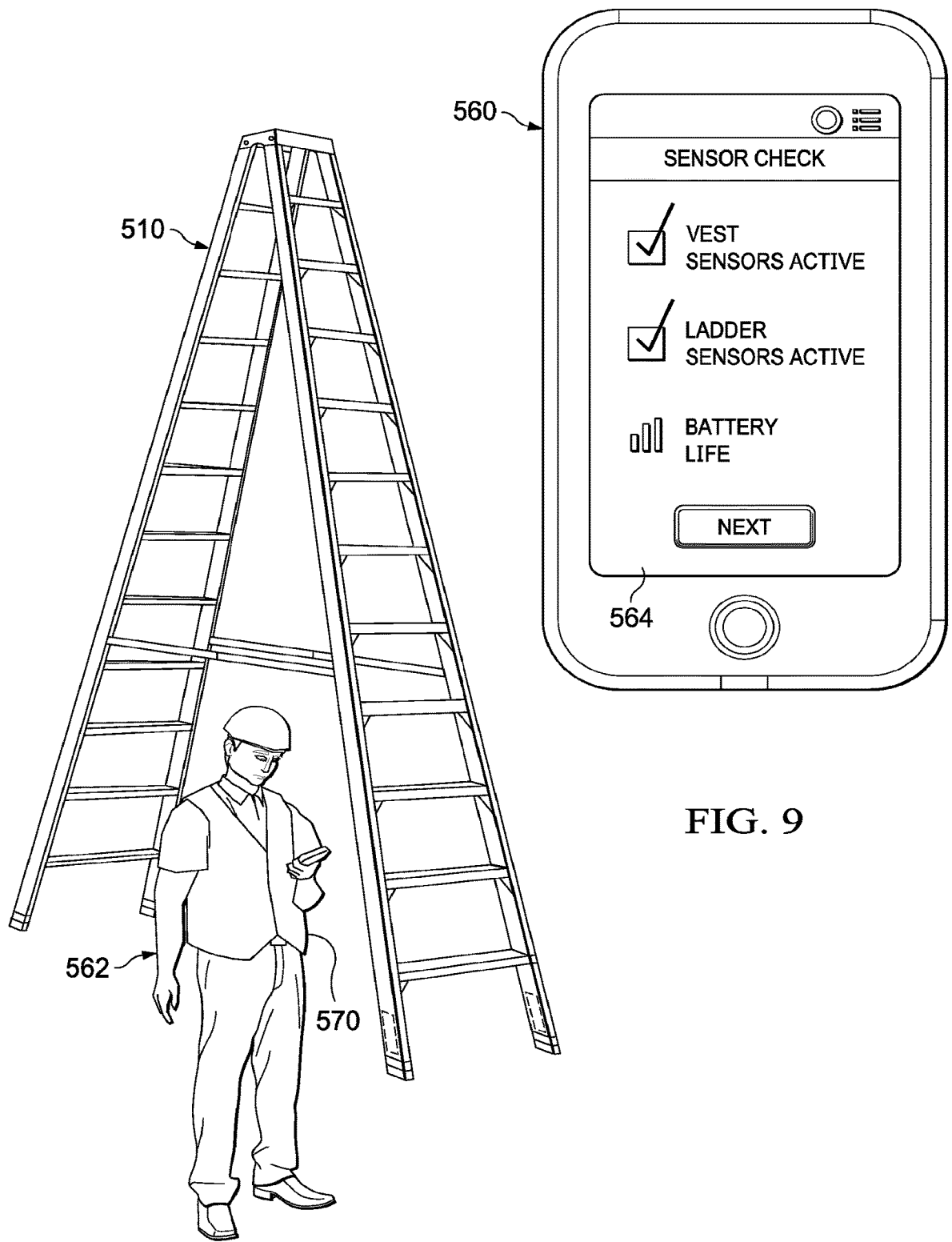
FIG. 9 is an isometric view depicting a ladder in association with a smartphone, in accordance with still yet another embodiment.

FIG. 9 illustrates an alternative operating condition for a smartphone 560 that is similar to the smartphone 60 illustrated in FIG. 5. The application loaded on the smartphone 560 can be provided in a sensor integrity mode that facilitates communication with sensors (not shown) on a ladder 510 to determine whether any of the sensors have failed. The application can generate a GUI 564 that can display various information about each of the sensors such as battery life, communication status, sensor status, and vest status.

The application on the smartphone 560 can be configured to operate in either a sleep mode or a monitoring mode. When in the sleep mode, the application and/or the sensors are deactivated. When in the monitoring mode, the application can communicate with the sensors to facilitate detection of abnormalities during use of the ladder 510. In one embodiment, the application can be selectively placed in either the sleep mode or the monitoring mode through a virtual button (not shown) on the GUI (not shown) that is presented on the smartphone 560. In such an embodiment, a user 562 can activate the virtual button to select operation of the application in either the sleep mode or the monitoring mode. In another embodiment, the application can detect when the ladder 510 is in use and can automatically operate in the monitoring mode when the ladder 510 is determined to be in use.

Figure 10:
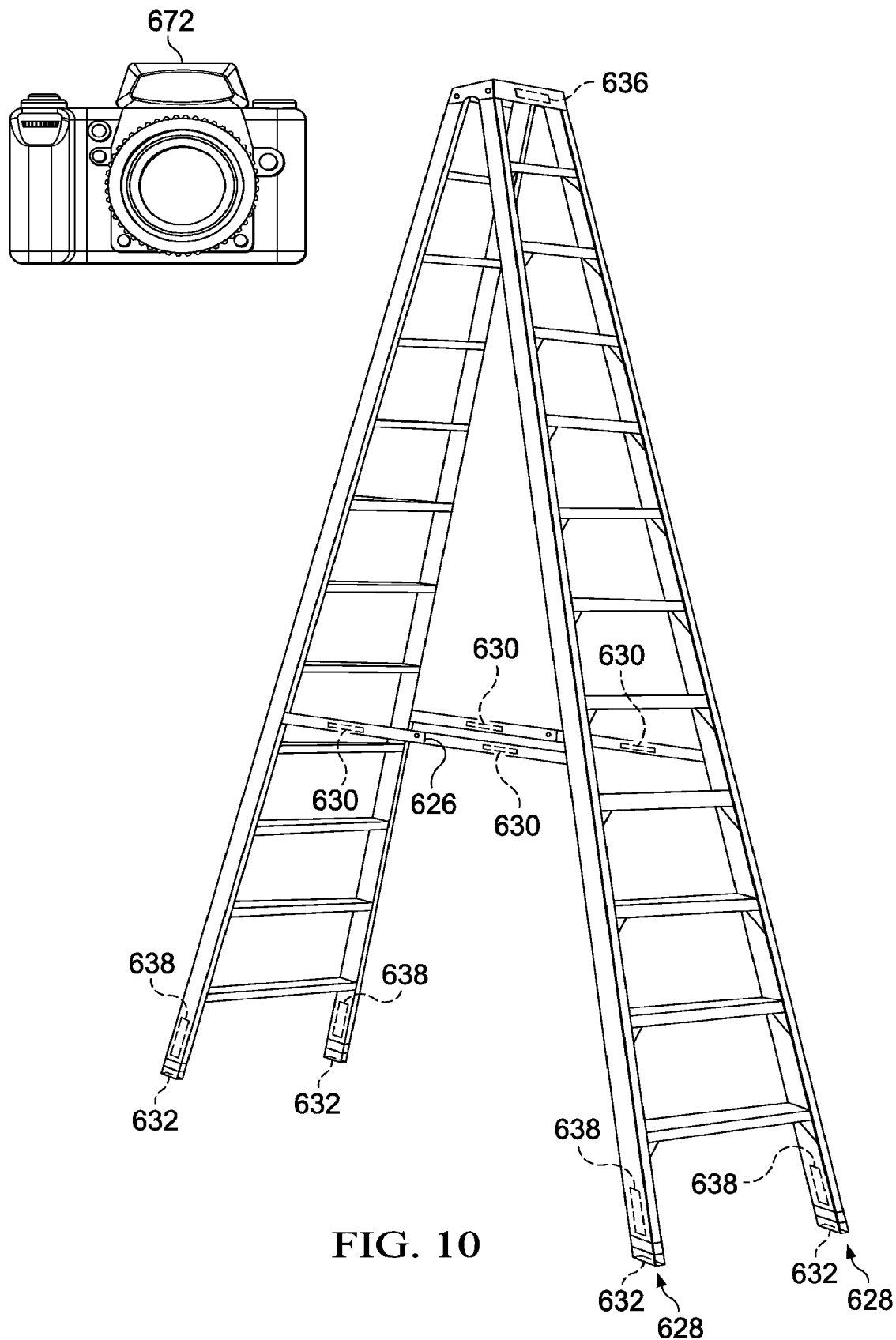
FIG. 10 is an isometric view depicting a ladder, in accordance with another embodiment.

FIG. 10 illustrates an alternative embodiment of a ladder 610 that is similar to the ladder 10 illustrated in FIG. 1. For example, the ladder 610 includes spreader bar sensors 630, base sensors 632, a top cap sensor 636, and side rail sensors 638. However, the spreader bar sensors 630 can be provided adjacent to a hinge member 626. In one embodiment, the base sensors 632 can comprise compressive load cells that are rated for 1000/2500 Pound Force (lbf). The side rail sensors 638 can be unidirectional strain gages. The top cap sensor 636 can comprise a three-axis accelerometer block that is configured to measure between 2-3 G.

As illustrated in FIG. 10, a camera 672 can also be provided that facilities real time monitoring of the use of the ladder 610. The camera 672 can be located on or near the ladder 610 and can capture images and/or video of the use of the ladder 610. The camera 672 can be communicatively coupled with a smartphone (e.g., 60) to display the images and/or video to a user (e.g., 62) or a third party. In one embodiment, the application loaded on the smartphone can be configured to automatically actuate the camera 672 when the sensor data generated by the sensors 632, 636, 638 indicates an abnormality and can save the images and/or video for later use (e.g., during an subsequent investigation of a fall).

Figure 11:
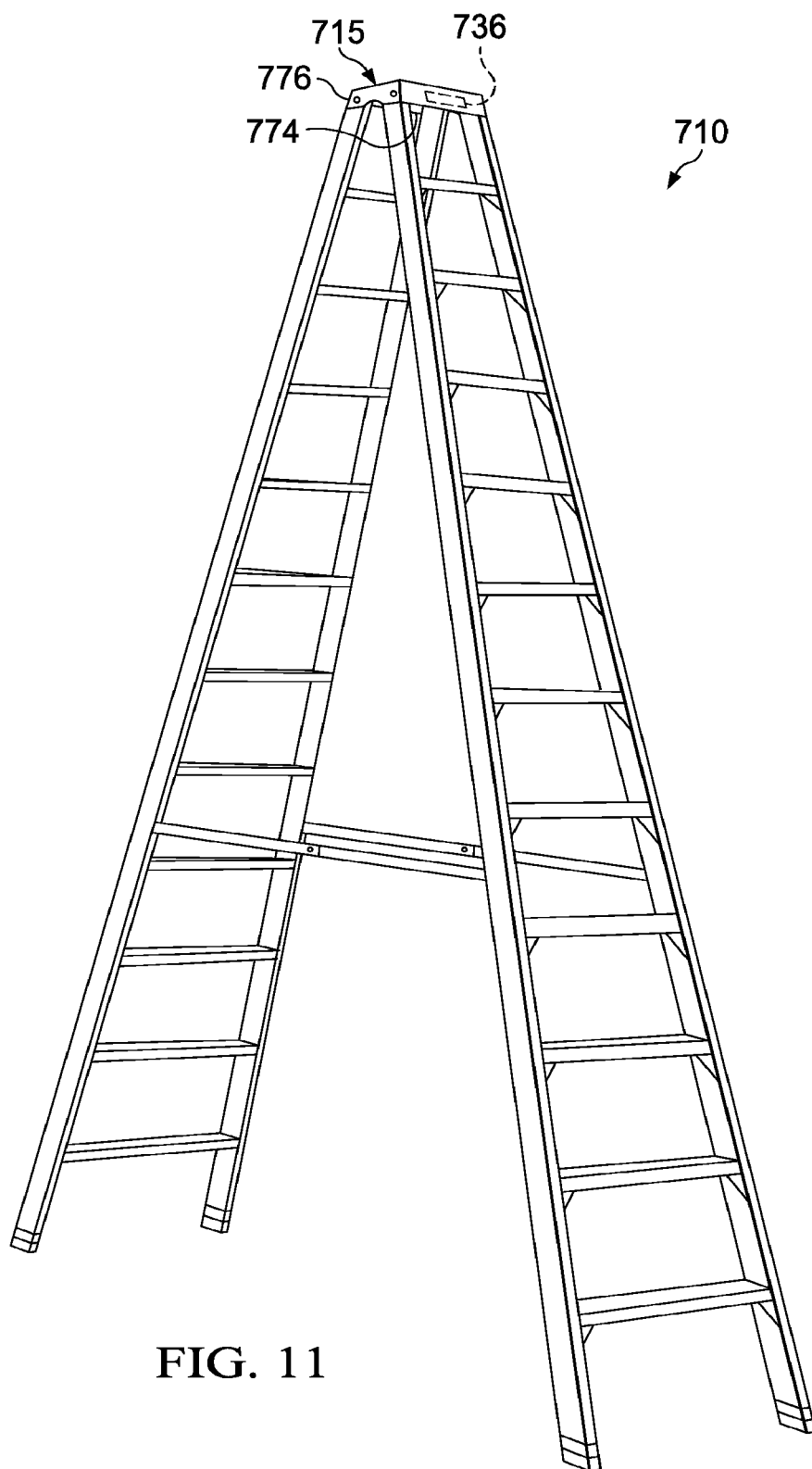
FIG. 11 is an isometric view depicting a ladder, in accordance with yet another embodiment.

Referring now to FIG. 11, an alternative embodiment of a ladder 710 is illustrated that is similar to, or the same as in many respects as, the ladder 10 in FIG. 1. For example, the ladder 710 can include a top cap 715 and a top cap sensor 736 coupled with the top cap 115. However, the top cap 715 can include a lower plate 774 that is substantially rigid and an upper cap plate 776 that is movably coupled with the lower plate 774. The top cap sensor 736 can be coupled with the upper cap plate 776 and can be configured to measure the movement of the upper cap plate 776 (e.g., warping) to detect when the ladder 710 has been tipped over.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "remote computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

The invention claimed is:

1. A non-transitory, processor-readable medium storing instructions that when executed by a processor of a remote computing device, cause the processor to:
    receive, from a sensor communicatively coupled to a ladder, a signal indicating a presence of a user on the ladder, the remote computing device including a smartphone remotely located from the ladder;
    periodically receive, from the sensor, sensor data while the user interacts with the ladder, the sensor data including information about the ladder during interaction with the user;
analyze the sensor data to determine an instability condition; and
    in response to determining the instability condition, generate an alert indicating a presence of the instability condition at the smartphone.

2. The non-transitory, processor-readable medium of claim 1, wherein the smartphone is operated by the user.

3. The non-transitory, processor-readable medium of claim 1, wherein the processor is further caused to transmit the alert to a remote computing device not operated by the user.

4. The non-transitory, processor-readable medium of claim 1, wherein the processor is further caused to transmit the alert to an emergency service provider.

5. The non-transitory, processor-readable medium of claim 1, wherein the sensor includes at least one of a load sensor, a spreader bar sensor, a base sensor, a strain sensor, a hall effect sensor, an inertial measurement unit (IMU), a step sensor or an impedance type sensor.

6. The non-transitory, processor-readable medium of claim 1, wherein the instructions to cause the processor to generate the alert generating the alert from an application loaded on the remote computing device.

7. The non-transitory, processor-readable medium of claim 1, wherein the sensor data can include usage data of the user on the ladder, the usage data including one or more duration of time spent on the ladder by the user, hazardous conditions encountered, and geographic location of the ladder and the user.

8. The non-transitory, processor-readable medium of claim 7, wherein the instructions further cause the processor to record the usage data of the user and generating a report, based on the usage data, to be displayed on the remote computing device.

9. An apparatus comprising a remote computing device, the remote computing device comprising:
    a processor; and
    a memory operatively coupled to the processor, the memory storing instructions to cause the processor to:
        receive, from a sensor communicatively coupled to a ladder that includes a pair of spreader bars, a signal indicating a presence of a user on the ladder based on a position of the pair of spreader bars, the remote computing device including a smartphone and remotely located from the ladder;
        periodically receive, from the sensor, sensor data while the user interacts with the ladder, the sensor data including the position of the pair of spreader bars;
        analyze the sensor data to determine an instability condition based on the position of the pair of spreader, the instability condition indicating that the pair of spreader bars is not fully extended; and
        in response to determining the instability condition, generate an alert indicating a presence of the instability condition at the smartphone.

10. The apparatus of claim 9, wherein the alert is presented at a smartphone.

11. A method of communication between a remote computing device and a ladder, the method comprising:
    coupling a sensor with a ladder;
    detecting, by a processor of the sensor and communicatively coupled to the ladder, a signal indicating a presence of a user on the ladder;
    periodically transmitting a signal representing sensor data to a processor of the remote computing device;
    analyzing the sensor data to determine an instability condition based on the user and the ladder; and
    generating a visual alert in response to a detection of the instability condition.

* * * * *